(12) United States Patent
Tang

(10) Patent No.: US 11,805,464 B2
(45) Date of Patent: Oct. 31, 2023

(54) MOBILE COMMUNICATION SYSTEM, METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/984,834

(22) Filed: Aug. 4, 2020

(65) Prior Publication Data
US 2020/0367131 A1    Nov. 19, 2020

Related U.S. Application Data

(63) Continuation of application No. PCT/CN2018/076243, filed on Feb. 11, 2018.

(51) Int. Cl.
*H04W 40/02*     (2009.01)
*H04W 28/06*     (2009.01)
*H04W 84/04*     (2009.01)

(52) U.S. Cl.
CPC ......... *H04W 40/02* (2013.01); *H04W 28/065* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 11,375,527 | B1* | 6/2022 | Eyuboglu | H04B 7/15528 |
| 2008/0095116 | A1* | 4/2008 | Kim | H04W 36/02 |
| | | | | 370/331 |

(Continued)

FOREIGN PATENT DOCUMENTS

| | | |
|---|---|---|
| CN | 101998657 A | 3/2011 |
| CN | 102098725 A | 6/2011 |

(Continued)

OTHER PUBLICATIONS

Australian Notice of acceptance for patent application for AU Application 2018407956 dated Jul. 21, 2021. (3 pages).

(Continued)

*Primary Examiner* — Khaled M Kassim
*Assistant Examiner* — Berhanu D Belete
(74) *Attorney, Agent, or Firm* — Young Basile Hanlon & MacFarlane, P.C.

(57) ABSTRACT

Provided are a mobile communication system, method and device, which relate to the technical field of communications. The system comprises: an anchor node, a master node, a relay network and a terminal, wherein the anchor node is connected to the master node by means of a fixed connection, and the anchor node is an anchor point of a user plane and/or a control plane; the master node is connected to the relay network by means of a first wireless connection, and the relay network is connected to the terminal by means of a second wireless connection; and the relay network comprises at least one relay node, and in the at least one relay node, there is a first relay node directly connected to the master node, and there is a second relay node directly connected to the terminal.

13 Claims, 5 Drawing Sheets

(56) References Cited

U.S. PATENT DOCUMENTS

| | | | | |
|---|---|---|---|---|
| 2008/0279061 | A1* | 11/2008 | Ogasawara | G11C 13/042 369/44.37 |
| 2010/0272006 | A1 | 10/2010 | Bertrand et al. | |
| 2010/0272007 | A1* | 10/2010 | Shen | H04B 7/2606 370/315 |
| 2010/0322197 | A1* | 12/2010 | Adjakple | H04W 36/023 370/332 |
| 2011/0185397 | A1* | 7/2011 | Escort | H04W 12/069 726/3 |
| 2011/0206094 | A1* | 8/2011 | Zhang | H04W 76/15 455/7 |
| 2012/0039243 | A1* | 2/2012 | Park | H04B 7/2606 370/315 |
| 2012/0040687 | A1* | 2/2012 | Siomina | G01S 5/019 455/422.1 |
| 2012/0224525 | A1* | 9/2012 | Wang | H04W 36/18 370/328 |
| 2013/0021968 | A1* | 1/2013 | Reznik | H04L 45/245 370/328 |
| 2013/0089022 | A1 | 4/2013 | Lu et al. | |
| 2013/0148490 | A1* | 6/2013 | Yi | H04W 76/19 370/216 |
| 2013/0244659 | A1* | 9/2013 | Murasawa | H04W 92/20 455/436 |
| 2013/0343261 | A1* | 12/2013 | Gonsa | H04W 76/25 370/315 |
| 2014/0071948 | A1* | 3/2014 | Kim | H04L 1/1841 370/331 |
| 2015/0067191 | A1* | 3/2015 | Makhervaks | H04L 45/74 709/244 |
| 2015/0305041 | A1* | 10/2015 | Kim | H04W 72/542 370/329 |
| 2015/0382258 | A1 | 12/2015 | Schmidt et al. | |
| 2016/0066363 | A1* | 3/2016 | Zhang | H04W 76/12 370/315 |
| 2017/0215122 | A1 | 7/2017 | Nigam et al. | |
| 2017/0223751 | A1* | 8/2017 | Lin | H04W 72/21 |
| 2017/0223755 | A1* | 8/2017 | Lin | H04W 74/0833 |
| 2017/0223766 | A1* | 8/2017 | Lin | H04W 36/08 |
| 2017/0289820 | A1* | 10/2017 | Hong | H04W 28/021 |
| 2017/0324848 | A1* | 11/2017 | Johnsen | H04L 45/7457 |
| 2017/0331577 | A1* | 11/2017 | Parkvall | H04W 4/00 |
| 2017/0331670 | A1* | 11/2017 | Parkvall | H04W 52/028 |
| 2017/0347332 | A1* | 11/2017 | Cui | H04W 8/24 |
| 2018/0020500 | A1* | 1/2018 | Pelletier | H04W 76/15 |
| 2018/0124641 | A1* | 5/2018 | Salkintzis | H04W 28/0819 |
| 2018/0192451 | A9* | 7/2018 | Kim | H04B 7/2612 |
| 2018/0234839 | A1* | 8/2018 | Tenny | H04W 36/0033 |
| 2018/0288823 | A1* | 10/2018 | Hampel | H04W 24/02 |
| 2018/0317279 | A1* | 11/2018 | Kim | H04L 1/18 |
| 2018/0332501 | A1* | 11/2018 | Tseng | H04L 1/08 |
| 2018/0376457 | A1* | 12/2018 | Tseng | H04L 1/16 |
| 2019/0029061 | A1* | 1/2019 | Feng | H04W 76/22 |
| 2019/0200273 | A1* | 6/2019 | Pedersen | H04L 69/22 |
| 2019/0215055 | A1* | 7/2019 | Majmundar | H04W 40/04 |
| 2019/0238345 | A1* | 8/2019 | Gage | H04W 24/10 |
| 2020/0344666 | A1* | 10/2020 | Wang | H04L 69/324 |
| 2021/0006968 | A1* | 1/2021 | Tenny | H04W 8/26 |
| 2021/0076368 | A1* | 3/2021 | Malkamaki | H04W 76/12 |

FOREIGN PATENT DOCUMENTS

| | | | |
|---|---|---|---|
| CN | 102340832 | A | 2/2012 |
| CN | 102714794 | A | 10/2012 |
| CN | 103327475 | A | 9/2013 |
| CN | 104540177 | A | 4/2015 |
| CN | 106465241 | A | 2/2017 |
| CN | 107347177 | A | 11/2017 |
| EP | 2453590 | A1 | 5/2012 |
| JP | 2016042726 | A | 3/2016 |
| KR | 20110074930 | A | 7/2011 |
| WO | WO-2019137505 | A1 * | 7/2019 ........... H04L 69/326 |

OTHER PUBLICATIONS

Korean Office Action with English Translation for KR Application 10-2020-7024948 dated Jun. 4, 2021. (15 pages).

Indian Examination Report for IN Application 202017033330 dated Aug. 10, 2021. (5 pages).

International Search Report for PCT/CN2018/076243 dated Oct. 29, 2018.

8881123GPP TSG RAN Meeting #75; RP-170821; Dubrovnik, Croatia, Mar. 6-9, 2017.

Australia Examination Report for Australia Application No. 2018407956 dated Feb. 17, 2021.

Extended European Search Report for European Application No. 18904549.5 dated Dec. 9, 2020.

3GPP TSG RAN2 WG2 #67; R2-094768; Multi-hop Relay support; Shenzhen, China, Aug. 24-28, 2009; pp. 1-6.

Japanese Office Action with English Translation for JP Application 2020542253 dated Sep. 3, 2021. (8 pages).

Chinese First Office Action with English Translation for CN Application 202010925445.6 dated Aug. 31, 2021. (10 pages).

3GPP TSG-RAN2 Meeting AH#1 Vancouver, Canada, OPPO, Discussion on flexible routing support in IAB, R2-1800156, Jan. 22-26, 2018, 6 pages.

3GPP TSG-RAN WG2 NR Adhoc 1801 Vancouver, Canada, R2-1800392, Nokia, Nokia Shanghai Bell, Architecture and Protocols: MAC adaptation layer based IAB, Jan. 22-26, 2018, 7 pages.

Chinese Second Office Action with English Translation for CN Application 202010925445.6 dated Nov. 17, 2021. (14 pages).

* cited by examiner

MOBILE COMMUNICATION SYSTEM, METHOD AND DEVICE

CROSS-REFERENCE TO RELATED APPLICATION(S)

This application is a continuation application of International Application No. PCT/CN2018/076243, filed on Feb. 11, 2018, and the entire disclosure of the application is hereby incorporated by reference.

TECHNICAL FIELD

Implementations of the present disclosure relate to the technical field of communication, in particular to a mobile communication system, a method, and a device.

BACKGROUND

In a Long-Term Evolution (LTE) system, a terminal can communicate with a network side through a relay node. The relay node is connected with a master cell through a wireless connection. In essence, the relay node is a low-power base station and is wirelessly connected to the rest of the network.

At present, there is no relay technology suitable for a New Radio (NR) system.

SUMMARY

Implementations of the present disclosure provide a mobile communication system, a method, and a device.

In one aspect, an implementation of the present disclosure provides a mobile communication system, wherein the system includes: an anchor node, a donor node, a relay network, and a terminal.

The anchor node is connected to the donor node through a fixed connection, and the anchor node is an anchor point of a user plane and/or a control plane.

The donor node is connected to the relay network through a first wireless connection, and the relay network is connected to the terminal through a second wireless connection.

The relay network includes at least one relay node, and in the at least one relay node, there is a first relay node directly connected to the donor node, and there is a second relay node directly connected to the terminal.

In another aspect, an implementation of the present disclosure provides a data transmission method, applied to an anchor node of a mobile communication system, wherein the mobile communication system includes: the anchor node, a donor node, a relay network, and a terminal. The anchor node is an anchor point of a user plane and/or a control plane, the donor node is connected to the relay network through a first wireless connection, the relay network is connected to the terminal through a second wireless connection, the relay network includes at least one relay node, and in the at least one relay node, there is a first relay node directly connected to the donor node, and there is a second relay node directly connected to the terminal.

The method includes: generating a corresponding first packet data convergence protocol (PDCP) protocol data unit (PDU) for the terminal; and sending the first PDCP PDU to the donor node through a fixed connection with the donor node.

In another aspect, an implementation of the present disclosure provides a data transmission method, applied to a donor node of a mobile communication system, wherein the mobile communication system includes: an anchor node, the donor node, a relay network, and a terminal. The anchor node is an anchor point of a user plane and/or a control plane, the donor node is connected to the relay network through a first wireless connection, the relay network is connected to the terminal through a second wireless connection, the relay network includes at least one relay node, and in the at least one relay node, there is a first relay node directly connected to the donor node, and there is a second relay node directly connected to the terminal.

The method includes: receiving a first PDCP PDU sent by the anchor node through a fixed connection with the anchor node; adding a first message header to the first PDCP PDU, wherein the first message header is used for supporting transmission of the first PDCP PDU to the second relay node in the relay network; and sending the first PDCP PDU added with the first message header to the first relay node.

In another aspect, an implementation of the present disclosure provides a data transmission method, applied to a first relay node of a mobile communication system, wherein the mobile communication system includes: an anchor node, a donor node, a relay network, and a terminal. The anchor node is an anchor point of a user plane and/or a control plane, the anchor node is connected to the donor node through a fixed connection, the donor node is connected to the relay network through a first wireless connection, the relay network is connected to the terminal through a second wireless connection, the relay network includes at least one relay node, and in the at least one relay node, there is the first relay node directly connected to the donor node, and there is a second relay node directly connected to the terminal.

The method includes: receiving a first PDCP PDU sent by the donor node; and sending the first PDCP PDU to the second relay node.

In another aspect, an implementation of the present disclosure provides a data transmission method, applied to a second relay node of a mobile communication system, wherein the mobile communication system includes: an anchor node, a donor node, a relay network, and a terminal. The anchor node is an anchor point of a user plane and/or a control plane, the anchor node is connected to the donor node through a fixed connection, the donor node is connected to the relay network through a first wireless connection, the relay network is connected to the terminal through a second wireless connection, the relay network includes at least one relay node, and in the at least one relay node, there is a first relay node directly connected to the donor node, and there is the second relay node directly connected to the terminal.

The method includes: receiving a first PDCP PDU sent by the first relay node; and sending the first PDCP PDU to the terminal.

In yet another aspect, an implementation of the present disclosure provides a data transmission device, applied to an anchor node of a mobile communication system, wherein the mobile communication system includes: the anchor node, a donor node, a relay network, and a terminal. The anchor node is an anchor point of a user plane and/or a control plane, the donor node is connected to the relay network through a first wireless connection, the relay network is connected to the terminal through a second wireless connection, the relay network includes at least one relay node, and in the at least one relay node, there is a first relay node directly connected to the donor node, and there is a second relay node directly connected to the terminal.

The device includes: a processing module and a sending module.

The processing module is configured to generate a corresponding first PDCP PDU for the terminal.

The sending module is configured to send the first PDCP PDU to the donor node through a fixed connection with the donor node.

In yet another aspect, an implementation of the present disclosure provides a data transmission device, applied to a donor node of a mobile communication system, wherein the mobile communication system includes: an anchor node, the donor node, a relay network, and a terminal. The anchor node is an anchor point of a user plane and/or a control plane, the donor node is connected to the relay network through a first wireless connection, the relay network is connected to the terminal through a second wireless connection, the relay network includes at least one relay node, and in the at least one relay node, there is a first relay node directly connected to the donor node, and there is a second relay node directly connected to the terminal.

The device includes: a receiving module, a processing module, and a sending module.

The receiving module is configured to receive a first PDCP PDU sent by the anchor node through a fixed connection with the anchor node.

The processing module is configured to add a first message header to the first PDCP PDU, wherein the first message header is used for supporting transmission of the first PDCP PDU to the second relay node in the relay network.

The sending module is configured to send the first PDCP PDU added with the first message header to the first relay node.

In yet another aspect, an implementation of the present disclosure provides a data transmission device, applied to a first relay node of a mobile communication system, wherein the mobile communication system includes: an anchor node, a donor node, a relay network, and a terminal. The anchor node is an anchor point of a user plane and/or a control plane, the anchor node is connected to the donor node through a fixed connection, the donor node is connected to the relay network through a first wireless connection, the relay network is connected to the terminal through a second wireless connection, the relay network includes at least one relay node, and in the at least one relay node, there is the first relay node directly connected to the donor node, and there is a second relay node directly connected to the terminal.

The device includes: a receiving module and a sending module.

The receiving module is configured to receive a first PDCP PDU sent by the donor node.

The sending module is configured to send the first PDCP PDU to the second relay node.

In yet another aspect, an implementation of the present disclosure provides a data transmission device, applied to a second relay node of a mobile communication system, wherein the mobile communication system includes: an anchor node, a donor node, a relay network, and a terminal. The anchor node is an anchor point of a user plane and/or a control plane, the anchor node is connected to the donor node through a fixed connection, the donor node is connected to the relay network through a first wireless connection, the relay network is connected to the terminal through a second wireless connection, the relay network includes at least one relay node, and in the at least one relay node, there is a first relay node directly connected to the donor node, and there is the second relay node directly connected to the terminal.

The device includes: a receiving module and a sending module.

The receiving module is configured to receive a first PDCP PDU sent by the first relay node.

The sending module is configured to send the first PDCP PDU to the terminal.

In still another aspect, an implementation of the present disclosure provides an anchor node, the anchor node includes a processor and a memory, and the memory stores at least one instruction for execution by the processor to implement the data transmission method on the anchor node side.

In still another aspect, an implementation of the present disclosure provides a donor node, the donor node includes a processor and a memory, and the memory stores at least one instruction for execution by the processor to implement the data transmission method on the donor node side.

In still another aspect, an implementation of the present disclosure provides a relay node, the relay node includes a processor and a memory, and the memory stores at least one instruction for execution by the processor to implement the data transmission method on the relay node side.

In further yet another aspect, an implementation of the present disclosure provides a computer-readable storage medium, and the storage medium stores at least one instruction for execution by a processor to implement the data transmission method on the anchor node side.

In further yet another aspect, an implementation of the present disclosure provides a computer-readable storage medium, and the storage medium stores at least one instruction for execution by a processor to implement the data transmission method on the donor node side.

In further yet another aspect, an implementation of the present disclosure provides a computer-readable storage medium, and the storage medium stores at least one instruction for execution by a processor to implement the data transmission method on the relay node side.

DETAILED DESCRIPTION

In order to make the object, technical solution and advantages of the present disclosure clearer, implementations of the present disclosure will be described in further detail below with reference to the accompanying drawings.

The "module" mentioned herein generally refers to a program or instruction stored in a memory capable of realizing a certain function. The "unit" mentioned herein generally refers to a functional structure divided according to logic, and the "unit" may be implemented by pure hardware or a combination of hardware and software.

Reference herein to "multiple" refers to two or more. "And/or" describes an association relationship of associated objects, indicating that there may be three relationships, for example, A and/or B may represent three situations: A alone, A and B at the same time, and B alone. Symbol "/" generally indicates that objects before and after the symbol "/" is in an "or" relationship. The words "first", "second" and the like used in the specification and claims of the present disclosure do not indicate any order, quantity or importance, but are only used for distinguishing different components.

Figure 1:
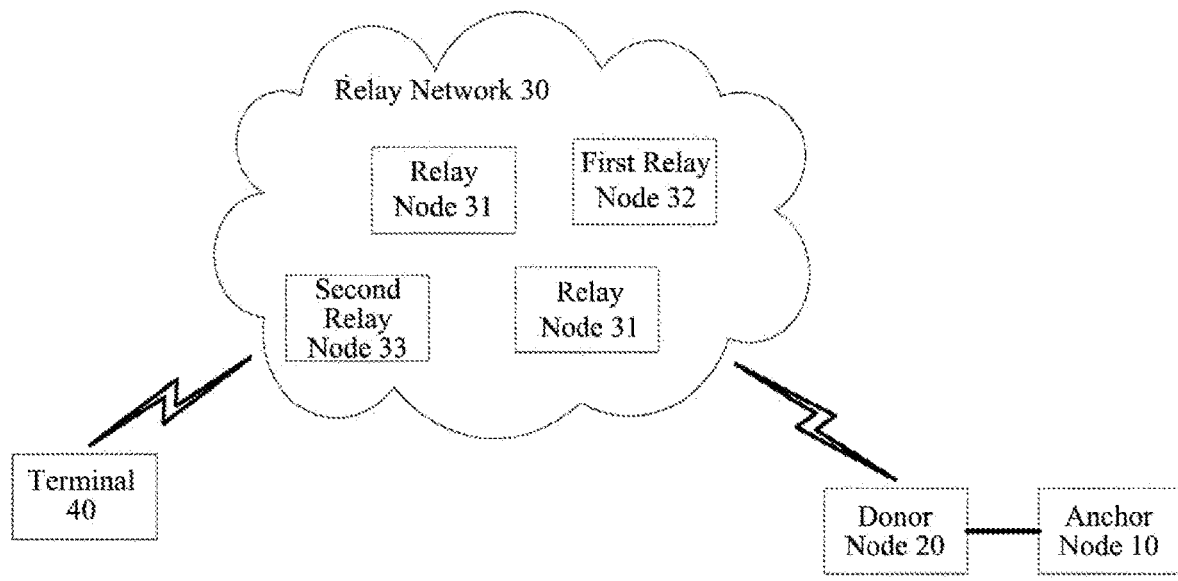
FIG. 1 is a schematic structural diagram of a mobile communication system provided by an implementation of the present disclosure.

Please refer to FIG. 1, which shows a schematic structural diagram of a mobile communication system provided by an implementation of the present disclosure. The mobile communication system may be a 5th Generation (5G) system, also known as an NR system. The mobile communication system may include an anchor node 10, a donor node 20, a relay network 30, and a terminal 40.

The anchor node 10 is an anchor point of a user plane and/or a control plane. The anchor node 10 may interface with a core network element. For example, the anchor node 10 interfaces with a user plane function (UPF) as an anchor point of a user plane, and/or the anchor node 10 interfaces with an access and mobility management function (AMF) as an anchor point of a control plane. The anchor node 10 and the donor node 20 are connected through a fixed connection. The fixed connection may also be referred to as a wired connection or a physical connection. For example, the anchor node 10 and the donor node 20 are connected through a communication cable.

The donor node 20 is connected to the relay network 30 through a first wireless connection. For example, the donor node 20 and the relay node 31 in the relay network 30 communicate with each other through air interface technology.

Each of the anchor node 10 and the donor node 20 may be an access network device such as a Base Station (BS). The access network device is deployed in the wireless access network to provide a wireless communication function for the terminal 40.

The relay network 30 is connected to the terminal 40 through a second wireless connection. For example, the terminal 40 and the relay node 31 in the relay network 30 may also communicate with each other through air interface technology. The terminal 40 may include various devices (such as handheld devices, vehicular devices, wearable devices, computing devices) with wireless connection capability, or other processing devices connected to a wireless modem, and various user equipment (UEs), mobile stations (MSs), terminal devices, and the like.

The relay network 30 includes at least one relay node 31. In the at least one relay node 31, there is a first relay node (denoted by a reference numeral 32 in the figure) directly connected to the donor node 20, and there is a second relay node (denoted by a reference numeral 33 in the figure) directly connected to the terminal 40. The first relay node 32 and the second relay node 33 may be the same relay node or two different relay nodes.

Optionally, the relay network 30 includes two or more relay nodes 31, and the two or more relay nodes 31 may form the relay network 30 through the Ad hoc network technology.

Data can be transmitted between the anchor node 10 and the terminal 40 through the donor node 20 and the relay network 30.

Optionally, the anchor node 10 is configured to generate a corresponding first PDCP PDU for the terminal 40 and send the first PDCP PDU to the donor node 20 through the above-mentioned fixed connection. The first PDCP PDU may be a PDCP PDU of the control plane or a PDCP PDU of the user plane.

Optionally, the donor node 20 is configured to receive the first PDCP PDU sent by the anchor node 10 and add a first message header to the first PDCP PDU. The first message header is used for supporting transmission of the first PDCP PDU to the second relay node 33, that is, the relay node serving the terminal 40, in the relay network 30.

Optionally, the first message header is used for implementing routing transmission and multi-hop transmission of the first PDCP PDU. When there are at least two nodes on a path from the donor node 20 to the second relay node 33, routing transmission and multi-hop transmission of the first PDCP PDU are implemented through the first message header. Two end nodes of the path are the donor node 20 and the second relay node 33, and the path optionally includes at least one other relay node 31 in addition to the first relay node 32 and the second relay node 33.

In some implementations of the present disclosure, the donor node 20 is further configured to add a second message header to the first PDCP PDU before the first message header is added to the first PDCP PDU. Optionally, the first PDCP PDU added with the second message header is called the second PDCP PDU. The second message header is used for multiplexing PDU sessions of at least two terminals 40 to a same PDCP connection, and the PDCP connection is established between the donor node 20 and the second relay node 33. For example, the second message header is a PDCP message header.

In some implementations of the present disclosure, the donor node 20 is further configured to add a third message header to the first PDCP PDU before the first message header is added to the first PDCP PDU. Optionally, the first PDCP PDU added with the third message header is called the third PDCP PDU. The third message header is used for distinguishing PDU sessions of at least two terminals 40. For example, the third message header is a general packet radio service tunnel protocol (GTP) message header and/or a user datagram protocol (UDP) message header and/or an Internet protocol (IP) message header.

In some implementations of the present disclosure, for the terminal 40, it may establish any one or more of the following bearers:

1. A signaling radio bearer (SRB) 1/2 is established between the terminal 40 and the anchor node 10; and/or the SRB 1/2 is established between the terminal 40 and the donor node 20.

2. An SRB 3 is established between the terminal 40 and the second relay node 33.

3. A radio link control (RLC) bearer of a master cell group (MCG) is established between the terminal 40 and the anchor node 10.

4. An RLC bearer of a secondary cell group (SCG) is established between the terminal 40 and the second relay node 33.

In some implementations of the present disclosure, for the second relay node 33, it may establish any one or more of the following bearers:

1. An SRB 1/2 is established between the second relay node 33 and the anchor node 10; and/or the SRB 1/2 is established between the second relay node 33 and the first relay node 32.

2. An SRB 3 is established between the second relay node 33 and the first relay node 32.

3. An RLC bearer of an MCG is established between the second relay node 33 and the anchor node 10.

4. An RLC bearer of an SCG is established between the second relay node 33 and the first relay node 32.

In some implementations of the present disclosure, for the first relay node 32, an SRB 3 may also be established between the first relay node 32 and the donor node 20.

In an implementation of the present disclosure, the SRB 1/2 may be configured to implement a signaling transmission function. The SRB 1 may be configured to transmit a radio resource control (RRC) message and has a higher priority than the SRB 2 before the SRB 2 is established. The SRB 2 may be configured to transmit a non-access stratum (NAS) message and has a lower priority than the SRB 1, and the SRB 2 is usually configured only after the security mode is activated. The SRB 3 is configured to implement a signaling transmission function related to the MCG.

Optionally, each relay node 31 in the relay network 30 is provided with a relay protocol stack X. The relay protocol stack X is used for determining a processing operation of the first PDCP PDU according to the first message header, wherein the processing operation includes forwarding to a high-level protocol stack of the relay node 31 or forwarding to other relay node 31 in the relay network 30. Optionally, the high-level protocol stack is a protocol stack located at an upper layer than the relay protocol stack X. Optionally, when the first message header provides the basis for determining that the first PDCP PDU is forwarded to other relay nodes 31 in the relay network 30, the first message header also provides the basis for determining which relay node 31 the first PDCP PDU is forwarded to. Taking the first relay node 32 as an example, if the first relay node 32 decides to forward the first PDCP PDU to other relay node 31, the first PDCP PDU would no longer be forwarded to the high-level protocol stack of the first relay node 32 for processing.

Figure 2:
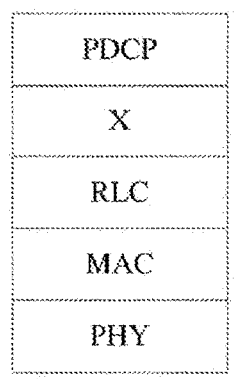
FIG. 2 is a schematic diagram of a radio protocol stack of a relay node according to an implementation of the present disclosure.

Optionally, the relay protocol stack X is located at an upper layer than an RLC protocol stack. Optionally, the relay protocol stack X is located at a lower layer than a PDCP protocol stack. In one example, the relay protocol stack X is located between the RLC protocol stack and the PDCP protocol stack. Illustratively, as shown in FIG. 2, the radio protocol stack of the relay node 31 sequentially includes a physical layer (PHY) protocol stack, a media access control (MAC) protocol stack, an RLC protocol stack, a relay protocol stack X, and a PDCP protocol stack from bottom to top.

In other possible examples, the relay protocol stack X may also belong to the same layer as the PDCP protocol stack.

In some implementations of the present disclosure, the first PDCP PDU is transmitted between the donor node 20 and the first relay node 32 by using an Automatic Repeat-reQuest (ARQ) retransmission mechanism. The first PDCP PDU is transmitted between the first relay node 32 and the second relay node 33 by using an ARQ retransmission mechanism. That is, the ARQ retransmission is performed in a point-to-point way between the donor node 20 and the first relay node 32 and between the first relay node 32 and the second relay node 33 to ensure lossless transmission.

In some implementations of the present disclosure, end-to-end encryption transmission and/or integrity protection and/or data retransmission is used between the anchor node 10 and the terminal 40 for the first PDCP PDU.

In some implementations of the present disclosure, end-to-end encryption transmission and/or integrity protection and/or data retransmission is used between the donor node 20 and the second relay node 33 for the second PDCP PDU.

Figure 3:
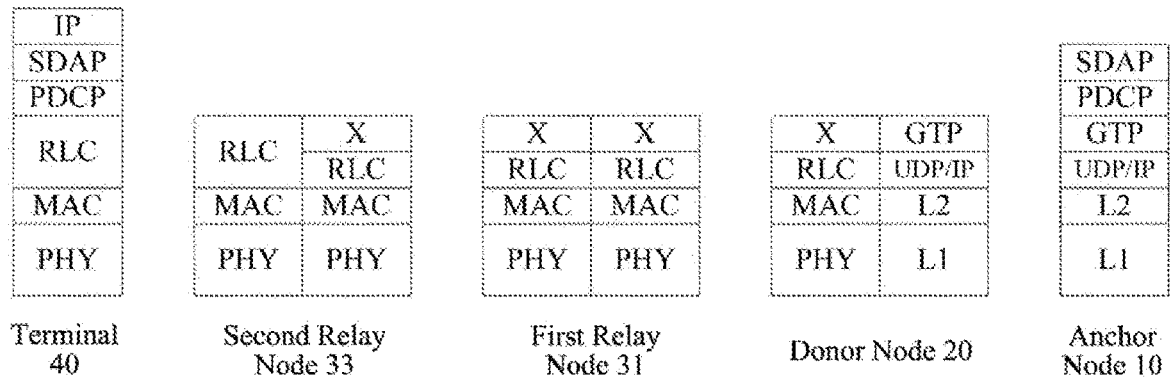
FIG. 3 is a schematic diagram of a radio protocol stack of each apparatus according to an implementation of the present disclosure.

Further reference may be made to FIG. 3, which shows a schematic diagram of a radio protocol stack of each apparatus in a mobile communication system according to an example implementation of the present disclosure.

A first data radio bearer (DRB) corresponding to the terminal 40 exists between the anchor node 10 and the terminal 40. The anchor node 10 makes data flow corresponding to the terminal 40 carried in the first DRB to be transmitted to the terminal 40. In this case, although the data flow passes through the second relay node 33, the second relay node 33 does not perform general packet radio service tunnelling protocol (GTP) layer processing on the data flow and passes the data flow through to the terminal 40.

Figure 4:
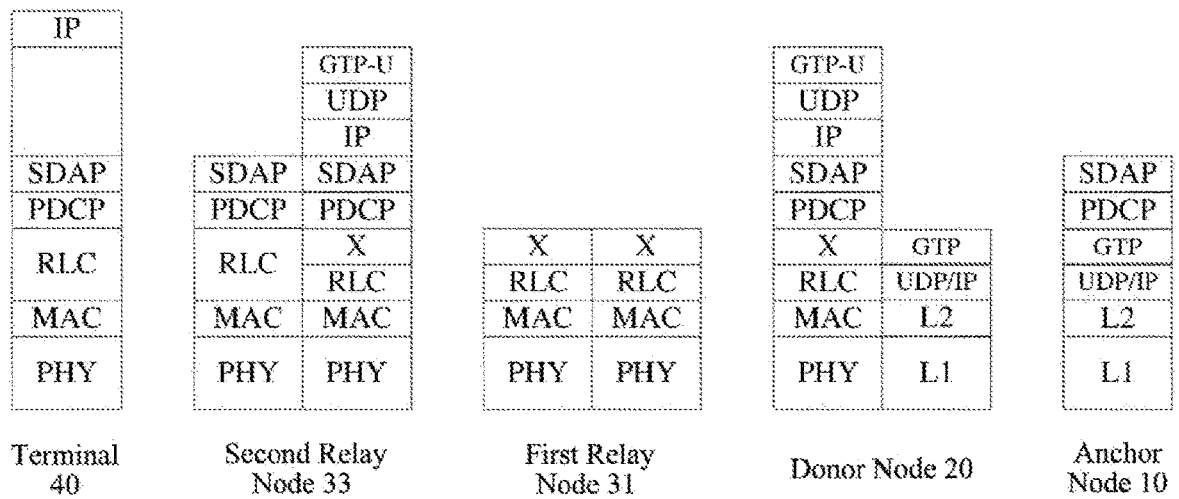
FIG. 4 is a schematic diagram of a radio protocol stack of each apparatus according to another implementation of the present disclosure.

Further reference may be made to FIG. 4, which shows a schematic diagram of a radio protocol stack of each apparatus in a mobile communication system according to another example implementation of the present disclosure.

A second DRB corresponding to the second relay node 33 exists between the anchor node 10 and the second relay node 33. The anchor node 10 makes data flow corresponding to the terminal 40 carried in the second DRB and transmitted to the second relay node 33, wherein the second relay node 33 sends the data flow to the terminal 40. Optionally, the second relay node 33 sends the data flow to the terminal 40 after GTP processing. Optionally, data flows corresponding to at least two terminals 40 are carried in the second DRB.

In some implementations of the present disclosure, the relay nodes 31 (such as the first relay node 32 and the second relay node 33) in the relay network 30 is used as a distributed unit (DU) and connected to the donor node 20 through a first interface, and the first interface is a CU-DU (central unit-distributed unit) interface.

In some implementations of the present disclosure, the relay nodes 31 (such as the first relay node 32 and the second relay node 33) in the relay network 30 is used as a base station (wherein the base station may be referred to as a gNB in the 5G system) and connected to the donor node 20 through a second interface, and the second interface is an N2, N3 or Xn interface.

Optionally, the relay node 31 in the relay network 30 accesses a target node according to a first access mode and obtains network configuration information through the target node, wherein the first access mode is an access mode of a terminal type.

Optionally, the relay node 31 in the relay network 30 obtains network configuration information through the target node and accesses the donor node 20 based on the network configuration information according to a second access mode, wherein the second access mode is an access mode of a relay node type. The above network configuration information may include relevant parameters of the second access mode, such as nodes used for accessing.

To sum up, a solution provided by an implementation of the present disclosure provides a relay technology suitable for a 5G system, which implements routing transmission and multi-hop transmission from a relay node to a donor node.

Figure 5:
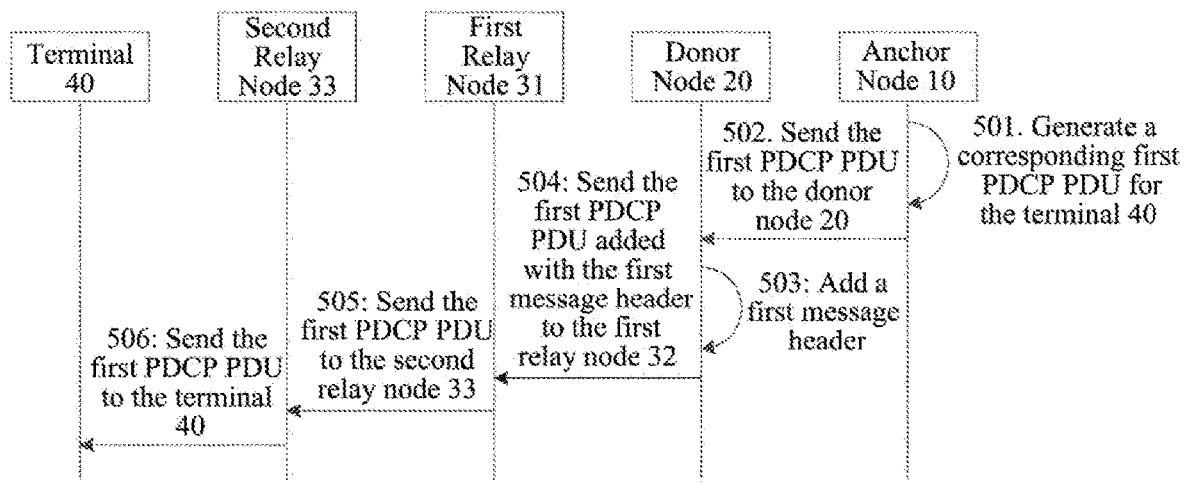
FIG. 5 is a flowchart of a data transmission method provided by an implementation of the present disclosure.

Please refer to FIG. 5, which shows a flowchart of a data transmission method provided by an implementation of the present disclosure. The method may be applied to the mobile communication system shown in FIG. 1. The method may include the following acts:

Act 501: The anchor node 10 generates a corresponding first PDCP PDU for the terminal 40.

Act 502: The anchor node 10 sends the first PDCP PDU to the donor node 20 through a fixed connection with the donor node 20.

Act 503: The donor node 20 adds a first message header to the first PDCP PDU.

The first message header is used for supporting transmission of the first PDCP PDU to the second relay node 33 in the relay network 30. The first message header is used for implementing routing transmission and multi-hop transmission of the first PDCP PDU.

Act 504: The donor node 20 sends the first PDCP PDU added with the first message header to the first relay node 32.

Act 505: The first relay node 32 sends the first PDCP PDU to the second relay node 33.

Act 506: The second relay node 33 sends the first PDCP PDU to the terminal 40.

To sum up, a solution provided by an implementation of the present disclosure provides a relay technology suitable for a 5G system, which implements routing transmission and multi-hop transmission from a relay node to a donor node.

For details not disclosed in the above method implementation, please refer to the system implementation of the present disclosure.

In addition, in the above method implementation, the technical solution of the present disclosure is described only from the perspective of interaction between the anchor node 10, the donor node 20, the first relay node 32, the second relay node 33 and the terminal 40. The above acts related to the anchor node 10 may be independently implemented as a data transmission method on the side of the anchor node 10, the above acts related to the donor node 20 may be independently implemented as a data transmission method on the side of the donor node 20, the above acts related to the first relay node 32 may be independently implemented as a data transmission method on the side of the first relay node 32, the above acts related to the second relay node 33 may be independently implemented as a data transmission method on the side of the second relay node 33, and the above acts related to the terminal 40 may be independently implemented as a data transmission method on the side of the terminal 40.

The following is a device implementation of the present disclosure. For details not described in the device implementation, reference may be made to the above method implementation or system implementation.

Figure 6:
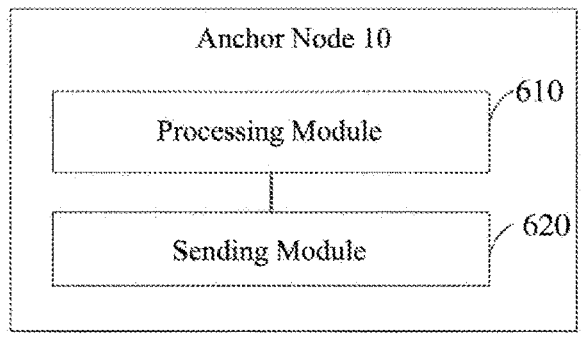
FIG. 6 is a block diagram of a data transmission device provided by an implementation of the present disclosure.

Please refer to FIG. 6, which shows a block diagram of a data transmission device provided by an implementation of the present disclosure. The device has the function of implementing the anchor node 10 in the above method and system implementations, and the function may be implemented by hardware or by hardware executing corresponding software. The device may include a processing module 610 and a sending module 620.

The processing module 610 is configured to generate a corresponding first PDCP PDU for the terminal 40.

The sending module 620 is configured to send the first PDCP PDU to the donor node 20 through a fixed connection with the donor node 20.

In an optional implementation, a first DRB corresponding to the terminal 40 exists between the anchor node 10 and the terminal 40.

The sending module 620 is further configured to make data flow corresponding to the terminal 40 carried in the first DRB to be transmitted to the second relay node 33, wherein the second relay node 33 sends the data flow to the terminal 40.

In an optional implementation, a second DRB corresponding to the second relay node 33 exists between the anchor node 10 and the second relay node 33.

The sending module 620 is further configured to make data flow corresponding to the terminal 40 carried in the second DRB to be transmitted to the second relay node 33, wherein the second relay node 33 sends the data flow to the terminal 40 after GTP processing.

Figure 7:
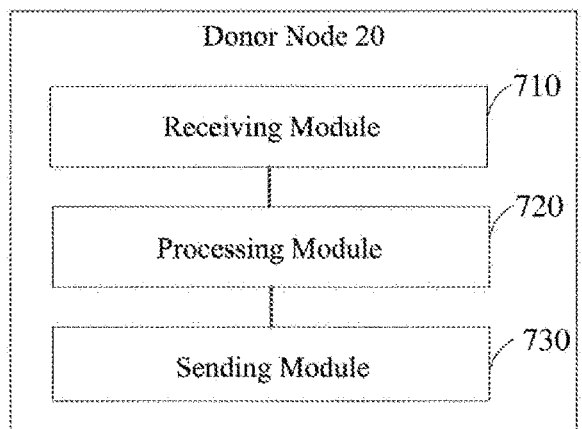
FIG. 7 is a block diagram of a data transmission device provided by another implementation of the present disclosure.

Please refer to FIG. 7, which shows a block diagram of a data transmission device provided by another implementation of the present disclosure. The device has the function of implementing the donor node 20 in the above method and system implementations, and the function may be implemented by hardware or by hardware executing corresponding software. The device may include a receiving module 710, a processing module 720 and a sending module 730.

The receiving module 710 is configured to receive a first PDCP PDU sent by the anchor node 10 through a fixed connection with the anchor node 10.

The processing module 720 is configured to add a first message header to the first PDCP PDU, wherein the first message header is used for supporting transmission of the first PDCP PDU to the second relay node 33 in the relay network 30.

The sending module 730 is configured to send the first PDCP PDU added with the first message header to the first relay node 32.

In an optional implementation, the first message header is used for implementing routing transmission and multi-hop transmission of the first PDCP PDU.

In an optional implementation, the processing module 720 is further configured to add a second message header to the first PDCP PDU; wherein the second message header is used for multiplexing PDU sessions of at least two terminals 40 to a same PDCP connection, and the PDCP connection is established between the donor node 20 and the second relay node 33.

In an optional implementation, the processing module 720 is further configured to add a third message header to the first PDCP PDU; wherein the third message header is used for distinguishing PDU sessions of at least two terminals 40.

Figure 8:
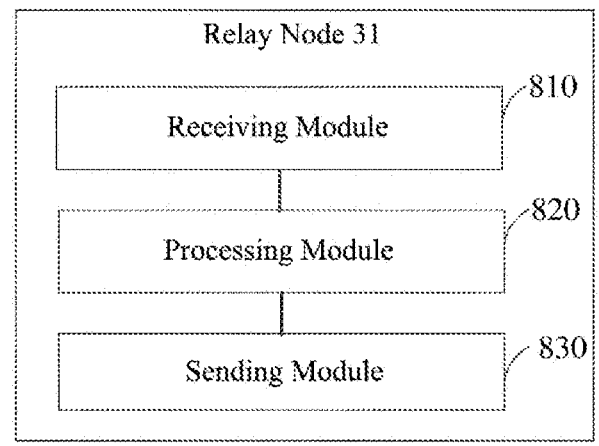
FIG. 8 is a block diagram of a data transmission device provided by another implementation of the present disclosure.

Please refer to FIG. 8, which shows a block diagram of a data transmission device provided by another implementation of the present disclosure. The device has the function of implementing the relay nodes 31 (such as the first relay node 32 and the second relay node 33) in the above method and system implementations, and the function may be implemented by hardware or by hardware executing corresponding software. The device may include a receiving module 810, a processing module 820, and a sending module 830.

When the device has the function of the first relay node 32, the receiving module 810 is configured to receive the first PDCP PDU sent by the donor node 20. The sending module 830 is configured to send the first PDCP PDU to the second relay node 33.

Optionally, the processing module 820 is configured to determine a processing operation for the first PDCP PDU according to a first message header of the first PDCP PDU, wherein the processing operation includes forwarding to a high-level protocol stack of the first relay node 32 or forwarding to the second relay node 33 in the relay network 30.

The sending module 830 is further configured to, when the processing module 820 determines that the processing operation for the first PDCP PDU includes forwarding to the second relay node 33, send the first PDCP PDU to the second relay node 33.

When the device has the function of the second relay node 33, the receiving module 810 is configured to receive the PDCP PDU sent by the first relay node 32. The sending module 830 is configured to send the PDCP PDU to the terminal 40.

Figure 9:
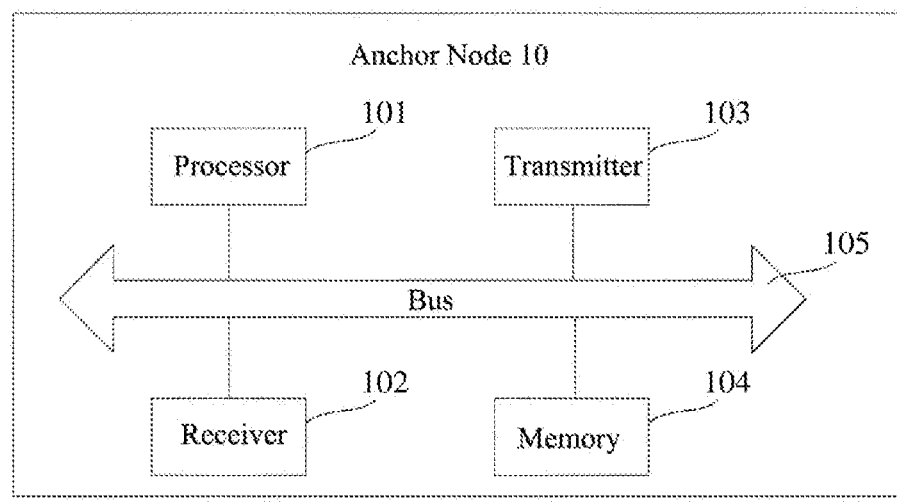
FIG. 9 is a schematic structural diagram of an anchor node provided by an implementation of the present disclosure.

Please refer to FIG. 9, which shows a schematic structural diagram of an anchor node 10 provided by an implementation of the present disclosure. The anchor node 10 may include a processor 101, a receiver 102, a transmitter 103, a memory 104 and a bus 105.

The processor 101 includes one or more processing cores. The processor 101 executes various functional applications and information processing by running software programs and modules.

The receiver 102 and the transmitter 103 may be implemented as communication components, which may be communication chips.

The memory 104 is connected to the processor 101 via the bus 105.

The memory 104 may be configured to store at least one instruction, and the processor 101 is configured to execute the at least one instruction to implement various acts executed by the anchor node 10 in the above method implementation.

In addition, the memory 104 may be implemented by any type of a transitory or non-transitory storage device or a combination thereof. The transitory or non-transitory storage device includes but not limited to a magnetic disk or an optical disk, an electrically erasable programmable read-only memory (EEPROM), an electrically programmable read-only memory (EPROM), a static random access memory (SRAM), a read only memory (ROM), a magnetic memory, a flash memory, and a programmable read only memory (PROM).

Figure 10:
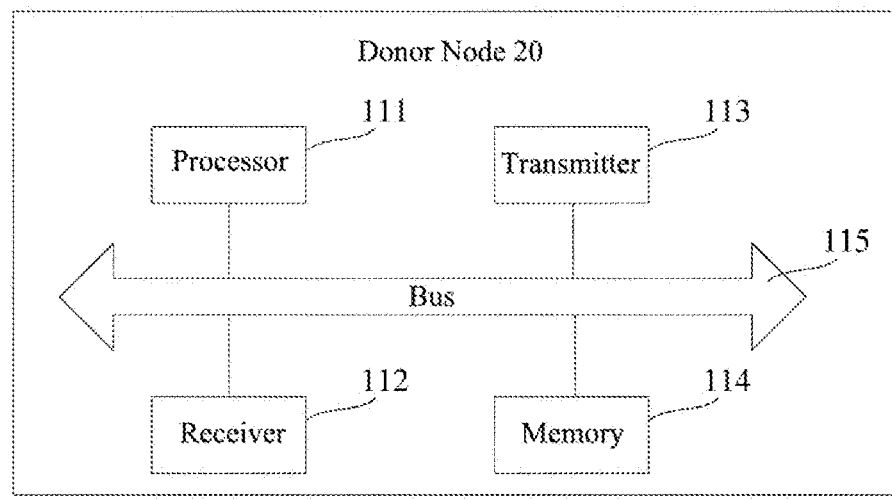
FIG. 10 is a schematic structural diagram of a donor node provided by an implementation of the present disclosure.

Please refer to FIG. 10, which shows a schematic structural diagram of a donor node 20 provided by an implementation of the present disclosure. The donor node 20 may include a processor 111, a receiver 112, a transmitter 113, a memory 114 and a bus 115.

The processor 111 includes one or more processing cores. The processor 111 executes various functional applications and information processing by running software programs and modules.

The receiver 112 and the transmitter 113 may be implemented as communication components, which may be communication chips.

The memory 114 is connected to the processor 111 via the bus 115.

The memory 114 may be configured to store at least one instruction, and the processor 111 is configured to execute the at least one instruction to implement various acts executed by the donor node 20 in the above method implementation.

In addition, the memory 114 may be implemented by any type of a transitory or non-transitory storage device or a combination thereof. The transitory or non-transitory storage device includes but not limited to a magnetic disk or an optical disk, an electrically erasable programmable read-only memory (EEPROM), an electrically programmable read-only memory (EPROM), a static random access memory (SRAM), a read only memory (ROM), a magnetic memory, a flash memory, and a programmable read only memory (PROM).

Figure 11:
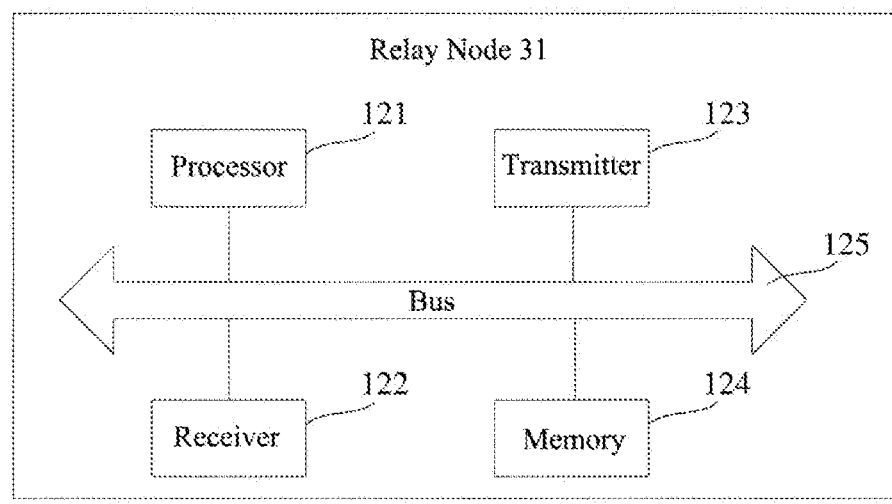
FIG. 11 is a schematic structural diagram of a relay node provided by an implementation of the present disclosure.

Please refer to FIG. 11, which shows a schematic structural diagram of a relay node 31 provided by an implementation of the present disclosure. The donor node 31 may include a processor 121, a receiver 122, a transmitter 123, a memory 124 and a bus 125.

The processor 121 includes one or more processing cores. The processor 121 executes various functional applications and information processing by running software programs and modules.

The receiver 122 and the transmitter 123 may be implemented as communication components, which may be communication chips.

The memory 124 is connected to the processor 121 via the bus 125.

The memory 124 may be configured to store at least one instruction, and the processor 121 is configured to execute the at least one instruction to implement various acts executed by the relay nodes 31 (including the first relay node 32 and the second relay node 33) in the above method implementation.

In addition, the memory 124 may be implemented by any type of a transitory or non-transitory storage device or a combination thereof. The transitory or non-transitory storage device includes but not limited to a magnetic disk or an optical disk, an electrically erasable programmable read-only memory (EEPROM), an electrically programmable read-only memory (EPROM), a static random access memory (SRAM), a read only memory (ROM), a magnetic memory, a flash memory, and a programmable read only memory (PROM).

An implementation of the present disclosure further provides a computer-readable storage medium, the storage medium stores at least one instruction, and the at least one instruction is loaded and executed by a processor to implement the data transmission method provided by the above-mentioned various method implementations.

The present disclosure further provides a computer program product. The computer program product, when running on a computer, causes the computer to execute the data transmission method provided by the above-mentioned various method implementations.

Those skilled in the art should realize that, in one or more examples described above, the functions described in implementations of the present disclosure may be implemented by using hardware, software, firmware or any combination thereof. When the present disclosure is implemented by software, the above functions may be stored in a computer readable medium or serve as one or multiple instructions or codes on the computer readable medium for transmission. The computer readable medium includes a computer storage medium and a communication medium, where the communication medium includes any medium for conveniently transmitting computer programs from one place to another place. The storage medium may be any available medium that a general purpose computer or a special purpose computer can access.

The above description is only example implementations of the present disclosure, and is not intended to limit the present disclosure. Any modification, equivalent substitution, improvement and the like made within the spirit and principle of the present disclosure shall be included in the protection scope of the present disclosure.

What is claimed is:

1. A system for mobile communication, wherein the system comprises: an anchor node, a donor node, a relay network, and a terminal, wherein
the anchor node is connected to the donor node through a fixed connection, and the anchor node is an anchor point of at least one of a user plane or a control plane;
the donor node is connected to the relay network through a first wireless connection, and the relay network is connected to the terminal through a second wireless connection;
the relay network comprises at least one relay node, and in the at least one relay node, there is a first relay node directly connected to the donor node, and there is a second relay node directly connected to the terminal;
the anchor node is configured to generate a corresponding first packet data convergence protocol (PDCP) protocol data unit (PDU) for the terminal and send the first PDCP PDU to the donor node through the fixed connection;
the donor node is configured to add a first message header to the first PDCP PDU; and
the first message header is used for supporting transmission of the first PDCP PDU to the second relay node in the relay network;
the first message header is used for implementing routing transmission and multi-hop transmission of the first PDCP PDU between the donor node and the second relay node;
a signaling radio bearer SRB 1/2 is established between the second relay node and the anchor node, and a signaling radio bearer SRB3 is established between the second relay node and the first relay node;
each relay node in the relay network is provided with a relay protocol stack X;
the relay protocol stack X is used for determining a processing operation of the first PDCP PDU according to the first message header, and the processing operation comprises forwarding to a high-level protocol stack of the each relay node or forwarding to other relay node in the relay network; and
the relay protocol stack X is located at an upper layer than a radio link control (RLC) protocol stack, or the relay protocol stack X is located at a lower layer than a PDCP protocol stack.

2. The system according to claim 1, wherein a signaling radio bearer SRB1/2 is established at least one of: between the terminal and the anchor node, or between the terminal and the donor node.

3. The system according to claim 1, wherein a radio link control (RLC) bearer of a master cell group (MCG) is established between the terminal and the anchor node, or a radio link control (RLC) bearer of a secondary cell group (SCG) is established between the terminal and the second relay node.

4. The system according to claim 1, wherein a signaling radio bearer SRB3 is established between the first relay node and the donor node.

5. The system according to claim 1, wherein a radio link control (RLC) bearer of a master cell group (MCG) is established between the second relay node and the anchor node.

6. The system according to claim 1, wherein the first PDCP PDU is transmitted between the donor node and the first relay node by using an automatic repeat request (ARQ) retransmission mechanism; and the first PDCP PDU is transmitted between the first relay node and the second relay node by using the ARQ retransmission mechanism.

7. The system according to claim 1, wherein at least one of: end-to-end encryption transmission, integrity protection, or data retransmission is used for the first PDCP PDU between the anchor node and the terminal.

8. The system according to claim 1, wherein a first data radio bearer (DRB) corresponding to the terminal exists between the anchor node and the terminal; and
the anchor node is configured to make data flow corresponding to the terminal carried in the first data radio bearer to be transmitted to the second relay node, wherein the second relay node sends the data flow to the terminal.

9. The system according to claim 1, wherein a second data radio bearer (DRB) corresponding to the second relay node exists between the anchor node and the second relay node; and the anchor node is configured to make data flow corresponding to the terminal carried in the second DRB to be transmitted to the second relay node, wherein the second relay node sends the data flow to the terminal after general packet radio service tunnelling protocol (GTP) processing.

10. The system according to claim 9, wherein data flows corresponding to at least two terminals are carried in the second DRB.

11. The system according to claim 1, wherein the second relay node is used as a distributed unit and connected to the donor node through a first interface, and the first interface is a central unit-distributed unit (CU-DU) interface.

12. A data transmission method, applied to an anchor node of a mobile communication system, wherein the mobile communication system comprises: the anchor node, a donor node, a relay network, and a terminal; the anchor node is an anchor point of at least one of a user plane or a control plane, the donor node is connected to the relay network through a first wireless connection, the relay network is connected to the terminal through a second wireless connection, the relay network comprises at least one relay node, wherein in the at least one relay node, there is a first relay node directly connected to the donor node, and there is a second relay node directly connected to the terminal; and
wherein the method comprises:
generating a corresponding first packet data convergence protocol (PDCP) protocol data unit (PDU) for the terminal; and
sending the first PDCP PDU to the donor node through a fixed connection with the donor node,
wherein a first message header is added to the first PDCP PDU at the donor node, the first message header is used for supporting transmission of the first PDCP PDU to the second relay node in the relay network, and the first message header is used for implementing routing transmission and multi-hop transmission of the first PDCP PDU between the donor node and the second relay node,
wherein a signaling radio bearer SRB1/2 is established between the second relay node and the anchor node, and a signaling radio bearer SRB3 is established between the second relay node and the first relay node,
wherein each relay node in the relay network is provided with a relay protocol stack X,
wherein the relay protocol stack X is used for determining a processing operation of the first PDCP PDU according to the first message header, wherein the processing operation comprises forwarding to a high-level protocol stack of the each relay node or forwarding to other relay node in the relay network, and wherein the relay protocol stack X is located at an upper layer than a radio link control (RLC) protocol stack, or the relay protocol stack X is located at a lower layer than a PDCP protocol stack.

13. A non-transitory computer-readable storage medium, wherein the non-transitory computer-readable storage medium stores at least one instruction for execution by a processor to implement a data transmission method applied to an anchor node of a mobile communication system, wherein the mobile communication system comprises: the anchor node, a donor node, a relay network, and a terminal; the anchor node is an anchor point of at least one of a user plane or a control plane, the donor node is connected to the relay network through a first wireless connection, the relay network is connected to the terminal through a second wireless connection, the relay network comprises at least one relay node, wherein in the at least one relay node, there is a first relay node directly connected to the donor node, and there is a second relay node directly connected to the terminal; and wherein the method comprises:
generating a corresponding first packet data convergence protocol (PDCP) protocol data unit (PDU) for the terminal; and sending the first PDCP PDU to the donor node through a fixed connection with the donor node, wherein a first message header is added to the first PDCP PDU at the donor node, the first message header is used for supporting transmission of the first PDCP PDU to the second relay node in the relay network, and the first message header is used for implementing routing transmission and multi-hop transmission of the first PDCP PDU between the donor node and the second relay node, wherein a signaling radio bearer SRB1/2 is established between the second relay node and the anchor node, and a signaling radio bearer SRB3 is established between the second relay node and the first relay node, wherein each relay node in the relay network is provided with a relay protocol stack X, wherein the relay protocol stack X is used for determining a processing operation of the first PDCP PDU according to the first message header, wherein the processing operation comprises forwarding to a high-level protocol stack of the each relay node or forwarding to other relay node in the relay network, and wherein the relay protocol stack X is located at an upper layer than a radio link control (RLC) protocol stack, or the relay protocol stack X is located at a lower layer than a PDCP protocol stack.

* * * * *